United States Patent
Udagawa et al.

(10) Patent No.: US 9,212,469 B2
(45) Date of Patent: Dec. 15, 2015

(54) WORK MACHINE

(71) Applicant: HITACHI CONSTRUCTION MACHINERY CO., LTD., Tokyo (JP)

(72) Inventors: Tsutomu Udagawa, Tsukuba (JP); Kazuo Fujishima, Tsuchiura (JP); Koji Ishikawa, Kasumigaura (JP); Hidetoshi Satake, Ishioka (JP); Yuichi Kunitomo, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/367,000

(22) PCT Filed: Dec. 18, 2012

(86) PCT No.: PCT/JP2012/082835
§ 371 (c)(1),
(2) Date: Jun. 19, 2014

(87) PCT Pub. No.: WO2013/094616
PCT Pub. Date: Jun. 27, 2013

(65) Prior Publication Data
US 2014/0371995 A1 Dec. 18, 2014

(30) Foreign Application Priority Data
Dec. 22, 2011 (JP) ................. 2011-282125

(51) Int. Cl.
*G06F 7/70* (2006.01)
*G06F 19/00* (2011.01)
(Continued)

(52) U.S. Cl.
CPC ............ *E02F 9/2058* (2013.01); *B60L 7/14* (2013.01); *B60L 11/123* (2013.01); *B60L 11/1861* (2013.01); *B60L 15/2009* (2013.01);
(Continued)

(58) Field of Classification Search
USPC ........................................... 701/50
See application file for complete search history.

(56) References Cited

U.S. PATENT DOCUMENTS

2008/0082240 A1* 4/2008 Kagoshima et al. ............ 701/50
2009/0301075 A1* 12/2009 Morinaga et al. ............. 60/459

FOREIGN PATENT DOCUMENTS

| JP | 2001-010783 A | 1/2001 |
| JP | 2008-088659 A | 4/2008 |

(Continued)

OTHER PUBLICATIONS

International Preliminary Report on Patentability received in International Application No. PCT/JP2012/082835 dated Jul. 3, 2014.

*Primary Examiner* — Imran Mustafa
(74) *Attorney, Agent, or Firm* — Mattingly & Malur, PC

(57) ABSTRACT

There is provided a hydraulic excavator including a hydraulic pump (6) driven by an engine (7), a boom cylinder (3a) driven by hydraulic fluid delivered from the hydraulic pump (6), a swing motor (16) driven electrically, an operating device (4A) for operating the boom cylinder (3a), an operating device (4B) for operating the swing motor (16), and a vehicle body controller (11) which limits the power of the swing motor (16) in accordance with the operation amount of the operating device (4A) when the two operating devices (4A, 4B) are operated in combination. The power limit value of the swing motor (16) varies depending on the output of the engine (7). This allows a good operational feeling to be retained in combined operation regardless of the operating state of the engine.

3 Claims, 9 Drawing Sheets

(51) Int. Cl.

| | | |
|---|---|---|
| *G06G 7/00* | (2006.01) | |
| *G06G 7/76* | (2006.01) | |
| *E02F 9/20* | (2006.01) | |
| *E02F 9/12* | (2006.01) | |
| *E02F 9/22* | (2006.01) | |
| *B60L 11/12* | (2006.01) | |
| *B60L 11/18* | (2006.01) | |
| *B60L 7/14* | (2006.01) | |
| *B60L 15/20* | (2006.01) | |

(52) U.S. Cl.
CPC .............. *E02F 9/123* (2013.01); *E02F 9/2025* (2013.01); *E02F 9/2037* (2013.01); *E02F 9/2095* (2013.01); *E02F 9/2285* (2013.01); *E02F 9/2296* (2013.01); *B60L 2200/40* (2013.01); *B60L 2210/40* (2013.01); *B60L 2240/421* (2013.01); *B60L 2240/423* (2013.01); *B60L 2240/441* (2013.01); *B60L 2240/443* (2013.01); *Y02T 10/6217* (2013.01); *Y02T 10/642* (2013.01); *Y02T 10/705* (2013.01); *Y02T 10/7005* (2013.01); *Y02T 10/7022* (2013.01); *Y02T 10/7044* (2013.01); *Y02T 10/7077* (2013.01); *Y02T 10/7241* (2013.01); *Y02T 10/7275* (2013.01)

(56) References Cited

FOREIGN PATENT DOCUMENTS

| | | |
|---|---|---|
| JP | 2010-189864 A | 9/2010 |
| WO | 2007/052538 A1 | 5/2007 |

* cited by examiner

WORK MACHINE

TECHNICAL FIELD

The present invention relates to a work machine equipped with hydraulic and electric actuators.

BACKGROUND ART

Some work machines including construction machines such as hydraulic excavators are equipped with a hydraulic pump driven by an engine and a plurality of hydraulic actuators driven by hydraulic pressure from the hydraulic pump. When two hydraulic actuators of this type of hydraulic work machine are operated simultaneously via separate operating devices to carry out a predetermined operation (combined motion), it is important to match the operating speeds of the two hydraulic actuators so as to provide the operator with a good operational feeling.

For example, suppose that a hydraulic excavator furnished with a hydraulic cylinder for rotating the boom (boom cylinder) and a hydraulic motor for swinging the upper swing structure performs a boom raising operation (swing boom raising) while swinging the upper swing structure. In such a case, it is preferred that the speed of the upper swing structure and that of the boom match each other when the control levers of the actuators have been maximally tilted, and the boom have been raised up to a body (a vessel) of a dump truck when the upper swing structure has been swung to the body position of the dump truck. For this reason, this type of hydraulic excavator has the power distribution to the boom cylinder and hydraulic motor adjusted optimally beforehand, for example, by control valves such that the speeds of the two actuators will correspond when a swing boom raising operation is performed.

Apart from the work machines that possess only hydraulic drive systems as described above, development is underway for hybrid work machines that have both a hydraulic drive system for driving hydraulic actuators and an electric drive system for driving electric actuators. Some of such hybrid work machines are exemplified as a hybrid hydraulic excavator equipped with a hydraulic pump driven by an engine, an hydraulic actuator driven by hydraulic pressure from the hydraulic pump, electric equipment that is capable of supplying electricity without affecting the absorption torque of the hydraulic pump (e.g., an electric storage device such as a secondary battery or a capacitor for storing the electric power generated by a motor generator), and an electric actuator driven by power from the electric equipment.

The hybrid work machines, which are capable of driving the hydraulic actuators and electric actuators by independent power sources, cannot adopt the technology of the aforementioned work machines (hydraulic excavators) that possess only the hydraulic drive system. For example, if the hybrid hydraulic excavator has no torque limits set on the swing motor during a combined motion involving the swing motor and boom cylinder, the swing speed of the upper swing structure tends to be higher than the boom raising speed. As a result, the swing speed and the boom raising speed may fail to match each other, leading to lower operability.

In view of the above problem, there is a work machine possessing control means which puts constraints on the torque or operating speed of the electric actuator (WO 2007/052538) when the hydraulic actuator (boom cylinder) and electric actuator (swing motor) are operated in combination. This work machine further distributes its power to the hydraulic and electric actuators such that the maximum output power of the engine or the output ratio between the hydraulic actuator and the electric actuator will approach a predetermined value; the distribution is in a manner that reduces the absorption power of the hydraulic pump in inverse proportion to the power of the electric actuator being raised.

PRIOR ART DOCUMENT

Patent Document

Patent Document 1: WO 2007/052538

SUMMARY OF THE INVENTION

Problem to be Solved by the Invention

Conventional hydraulic excavators have a hydraulic pump driven by an engine and cause a plurality of hydraulic actuators to be driven by hydraulic fluid from the hydraulic pump. Such hydraulic excavators, subject to an output constraint on the engine as the power source of the hydraulic actuators, are configured to maintain an energy balance (power balance) per unit time within their systems. That is, in order to let the multiple actuators have same operating speeds as the conventional hydraulic excavator does, what is important is a balance of power between the actuators.

In that respect, the work machine disclosed by the above-cited document limits the torque or speed of the electric actuator in accordance with the load of the hydraulic actuators (or delivery pressure of the hydraulic pump), thereby attempting to match the operating speeds of the electric and hydraulic actuators. However, since the torque or speed of the electric actuator can be converted by, for example, a reducer, it is not enough to limit the torque or speed of the actuator in trying to reach an energy balance within the systems.

An object of the present invention is to provide a work machine that can keep a good operational feeling during a combined motion.

Means for Solving the Problem

To achieve the above object, the present invention provides a work machine including: an engine; a hydraulic pump driven by the engine; a hydraulic actuator driven by hydraulic fluid delivered by the hydraulic pump; an electrically-driven electric actuator; a first operating device which operates the hydraulic actuator; a second operating device which operates the electric actuator; and a control device which limits the power of the electric actuator in accordance with the amount of operation of the first operating device when the first and the second operating devices are operated in combination.

Effect of the Invention

According to the present invention, it is possible to retain a good operational feeling during a combined motion.

MODE FOR CARRYING OUT THE INVENTION

Figure 1:
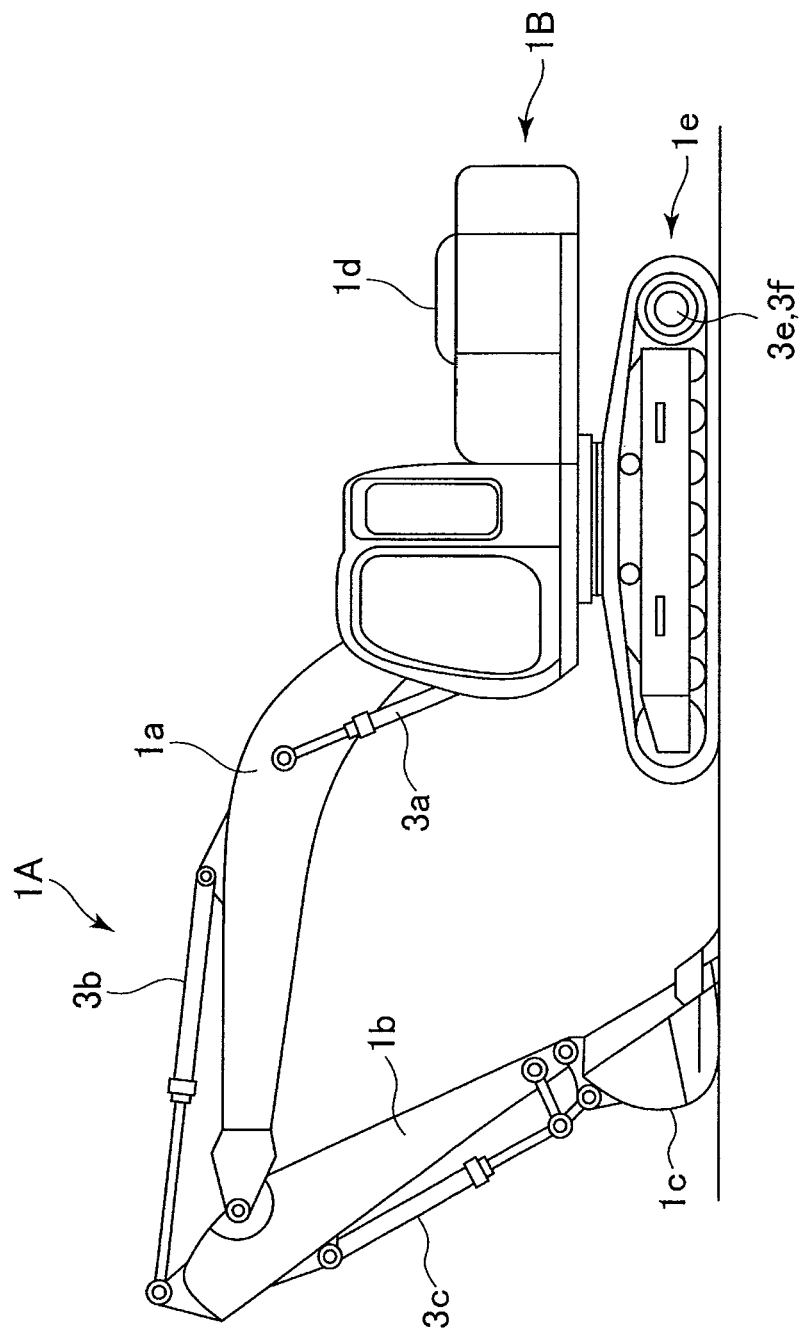
FIG. 1 is an external view of a hybrid hydraulic excavator in an embodiment of the present invention.

Some preferred embodiments of the present invention are explained below with reference to the accompanying drawings. FIG. 1 is an external view of a hybrid hydraulic excavator in an embodiment of the present invention. The hydraulic excavator in this drawing is equipped with an articulated work device 1A having a boom 1a, an arm 1b, and a bucket 1c; and a vehicle body 1B possessing an upper swing structure 1d and a lower travel structure 1e.

The boom 1a is supported rotatably by the upper swing structure 1d and driven by a hydraulic cylinder {boom cylinder (hydraulic actuator)} 3a. The arm 1b is supported rotatably by the boom 1a and driven by a hydraulic cylinder {arm cylinder (hydraulic actuator)} 3b. The bucket 1c is supported rotatably by the arm 1b and driven by a hydraulic cylinder {bucket cylinder (hydraulic actuator)} 3c. The upper swing structure 1d is driven swingably by a swing motor (electric motor) 16 (see FIG. 2) serving as an electric actuator. The lower travel structure 1e is driven in by right-hand and left-hand travel motors (hydraulic motors) 3e and 3f (see FIG. 2). The hydraulic cylinders 3a, 3b, and 3c, and the swing motor 16 are driven under control of operating devices 4A and 4B (see FIG. 2) which are installed inside the cab of the upper swing structure 1d and which output hydraulic signals.

Figure 2:
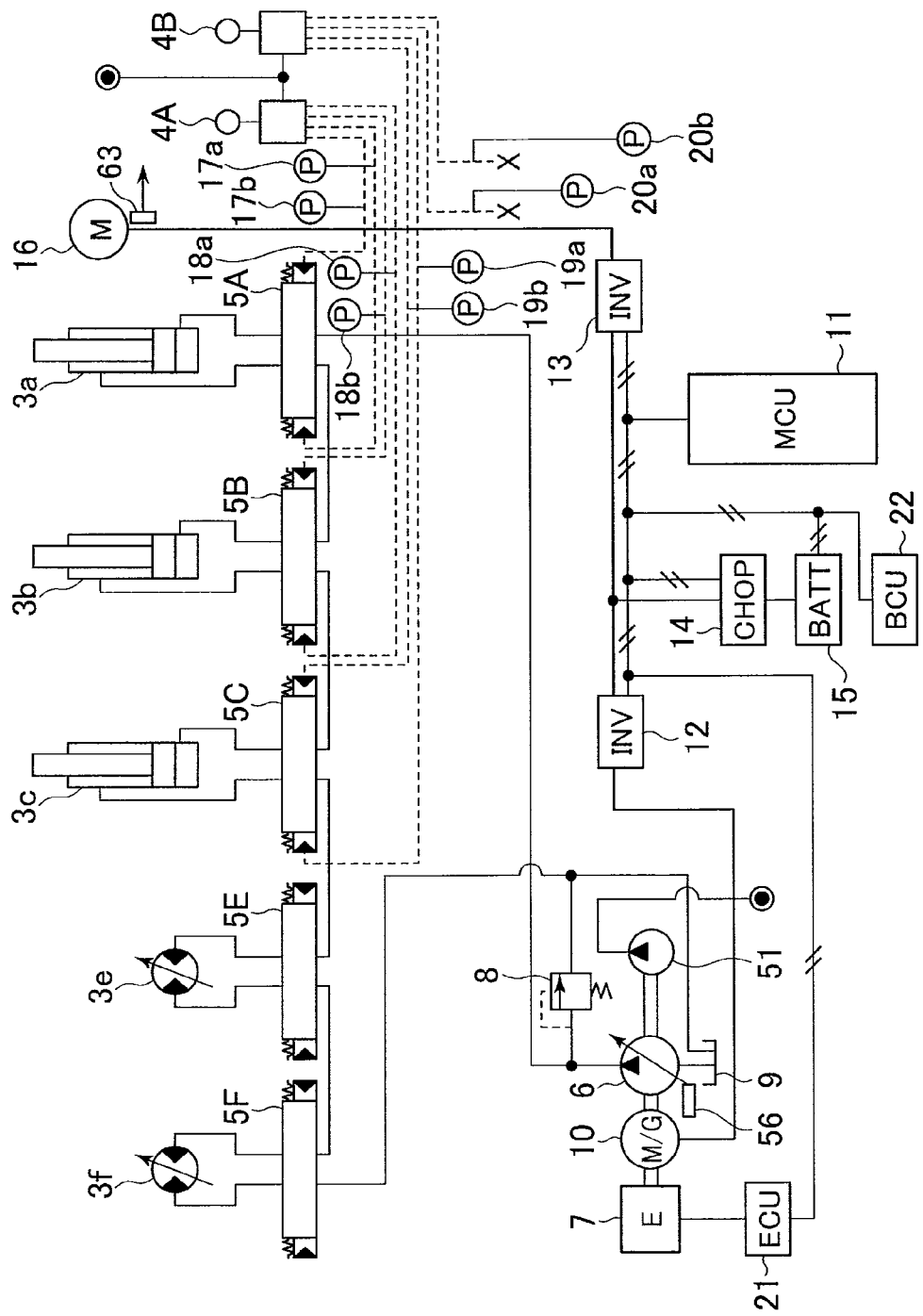
FIG. 2 is a schematic view of a drive control system of the hydraulic excavator in an embodiment of the invention.

FIG. 2 is a schematic view of a drive control system of the hydraulic excavator in an embodiment of the invention. In this drawing, the components referred to above are designated by the same reference numerals, and their explanations are omitted (the same holds for all subsequent drawings). The drive control system in this drawing is furnished with operating devices 4A and 4B, control valves (spool type directional control valves) 5A, 5B, and 5C, pressure sensors 17 and 18 that convert hydraulic signals into electric signals, an inverter device (power converter) 13, a chopper 14, a battery (electrical storage device) 15, and an inverter device (power converter) 12. The drive control system is equipped with a vehicle body controller (MCU) 11, a battery controller (BCU) 22, and an engine controller (ECU) 21 as control equipment.

In terms of hardware, the vehicle body controller (MCU) 11, battery controller (BCU) 22, and engine controller (ECU) 21 are each configured to include an arithmetic processing unit for executing various control programs {e.g., central processing unit (CPU)}, and a storage device for storing diverse data such as the control programs {e.g., read only memory (ROM) and random access memory (RAM)} (either of these is not shown). Although the controllers 11, 21, and 22 are explained here as each having a different hardware configuration, it is also possible to use common hardware that performs a calculation to be executed by the controllers 11, 21, and 22.

The operating devices 4A and 4B generate hydraulic signals (pilot pressures) for controlling the hydraulic cylinders 3a, 3b, and 3c as well as the swing motor 16 by lowering to secondary pressures the hydraulic fluid supplied from a pilot pump 51 connected to the engine 7.

The operating device (first operating device) 4A is connected via pilot lines to a pressure receiver of the control valve 5A controlling the drive of the hydraulic cylinder 3a (boom cylinder) and to a pressure receiver of the control valve 5B controlling the drive of the hydraulic cylinder 3b (arm cylinder). In accordance with the tilt direction of the control lever (operation direction) and the tilt amount (operation amount) thereof, the operating device 4A outputs hydraulic pressure signals to the pressure receivers of the control valves 5A and 5B. Given the hydraulic pressure signals input from the operating device 4A, the control valves 5A and 5B change their switchover positions accordingly to control the flow of the hydraulic fluid delivered from the hydraulic pump 6. The control valves 5A and 5B thereby regulates the drive of the hydraulic cylinders 3a and 3b.

Each of the four pilot lines connecting the operating device 4A with the pressure receivers of the two control valves 5A and 5B is provided with pressure sensors 17a, 17b, 18a, and 18b. The pressure sensors 17a, 17b, 18a, and 18b function as signal conversion means that detects the pressures of the hydraulic signals output from the operating device 4A and converts the detected pressures into electric signals. The electric signals from conversion by the pressure sensors 17a, 17b, 18a, and 18b are output to the vehicle body controller 11. The pressure sensor 17a outputs the electric signal to order an extension of the hydraulic cylinder 3a (extension operation), and the pressure sensor 17b outputs the electric signal to instruct a contraction of the hydraulic cylinder 3a (contraction operation). The pressure sensor 18a outputs the electric signal to order an extension of the hydraulic cylinder 3b, and the pressure sensor 18b outputs the electric signal to instruct a contraction of the hydraulic cylinder 3b.

The operating device (second operating device) 4B is connected via pilot lines to a pressure receiver of the control valve 5C controlling the drive of the hydraulic cylinder 3c (bucket cylinder). In accordance with the tilt direction of the control lever (operation direction) and the tilt amount thereof (operation amount), the operating device 4B outputs a hydraulic pressure signal to the pressure receiver of the control valve 5C. Given the hydraulic pressure signal input from the operating device 4B, the control valve 5C changes its switchover position accordingly to control the flow of the hydraulic fluid delivered from the hydraulic pump 6. The control valve 5C thereby regulates the drive of the hydraulic cylinder 3c.

The control levers of the operating devices 4A and 4B can each be tilted in two directions (forward and reverse, i.e., in two operation directions) and thus possess bidirectional operation polarity. When tilted in either direction, the control levers can request the hydraulic cylinders and the motor to operate in the forward or reverse direction in a manner that reflects the lever operation amount.

Furthermore, each of the four pilot lines including the above-mentioned two pilot lines and connected to the operating device 4B is equipped with pressure sensors 19a, 19b, 20a, and 20b. The pressure sensors 19a, 19b, 20a, and 20b function as signal conversion means that detects the pressures of the hydraulic signals output from the operating device 4B and converts the detected pressures into electric signals. The electric signals from the conversion by the pressure sensors 19a, 19b, 20a, and 20b are output to the vehicle body controller 11. The pressure sensor 19a outputs the electric signal to order extension of the hydraulic cylinder 3c, and the pressure sensor 19b outputs the electric signal to instruct contraction of the hydraulic cylinder 3c. The pressure sensor 20a outputs the electric signal to order the drive of the swing motor 16 in a manner that causes the upper swing structure 1d to swing counterclockwise, and the pressure sensor 20b outputs the electric signal to instruct the drive of the swing motor 16 in a manner causing the upper swing structure 1d to swing clockwise. In the ensuing description, the subscripts (a, b) attached to the pressure sensors 17 to 20 may be omitted where there is no specific need for distinction between the sensors.

The pressure receivers of control valves 5E and 5F are connected via pilot lines to a travel operation device (not shown) installed inside the cab. Given hydraulic signals input from the travel operation device, the control valves 5E and 5F change their switchover positions accordingly to control the flow of the hydraulic fluid delivered from the hydraulic pump 6. The control valves 5E and 5F thereby regulates the drive of the travel motors 3e and 3f.

The battery controller (BCU) 22 controls the charging and discharging of the battery 15. As such, the battery controller 22 has functions to calculate the remaining amount of stored electricity {state of charge (SOC)} and the degree of deterioration {state of health (SOH)} of the battery 15. The battery controller 22 outputs the result of the calculation to the vehicle body controller 11. The SOC may be defined as "remaining capacity [Ah]/fully-charged capacity [Ah]*100," and the SOH as "fully-charged capacity in deteriorated state [Ah]/fully-charged capacity in initial state [Ah]*100." These values can be estimated using various known methods of calculation.

On the basis of the electric signals input from the pressure sensors 17, 18, 19 and 20, the vehicle body controller (MCU) 11 plays two roles: controlling the drive of the swing motor 16 via the inverter device 13, and controlling the tilt angle (capacity) of the hydraulic pump via a regulator (pump capacity adjusting means) 56 (the details of these controls will be discussed later). The vehicle body controller 11 also controls power regeneration whereby electric energy is recovered from the swing motor 16 when the swing motion of the upper swing structure 1d is braked. The vehicle body controller 11 further arranges the charge to the battery 15 with the power regenerated through power regenerative control and with excess power generated by the motor generator (power converter) 10 (e.g., when the load on the hydraulic pump 6 is light).

Given commands from an engine speed input device {e.g., an engine control dial (not shown)} through which the operator inputs the revolution speed of the engine 7, the engine controller (ECU) 21 controls the injection quantity and the engine speed in such a manner that the engine 7 rotates at the target revolution speed. Also, the engine controller 21 may control the engine 7 on the basis of a target revolution speed determined by the vehicle body controller 11 in accordance with other constraints. The value input from the engine speed input device may precede the target revolution speed in keeping with the other constraints.

The output shaft of the engine 7 (prime mover) is jointed with the motor generator 10. The output shaft of the motor generator 10 is connected with the hydraulic pump 6 and pilot pump 51.

The motor generator 100 offers a function as a motor that assists the hydraulic pump 6 (engine 7) in drive using the electric energy supplied from the battery 15 in addition to as a generator that converts the power of the engine 7 into electric energy which is output to the inverter devices 12 and 13.

The hydraulic pump 6 is a variable displacement hydraulic pump that supplies hydraulic fluid to the hydraulic cylinders 3a, 3b, and 3c serving as hydraulic actuators as well as to the hydraulic motors 3e and 3f. The capacity of the hydraulic pump 6 (tilt angle) is controlled by the vehicle body controller 11 via the regulator (pump capacity adjusting means) 56. A relief valve is attached to the hydraulic line connected to the hydraulic pump 6. When there occurs an excess rise in the pressure inside the hydraulic line, the relief valve 8 releases the hydraulic fluid to a tank 9.

The pilot pump 51 supplies hydraulic fluid as operation signals to the control valves 5A, 5B, 5C, 5D, 5E, and 5F via the operating devices 4A and 4B and travel operation device.

The inverter device 12 provides drive control of the motor generator 10 on the basis of the output from the vehicle body controller 11. When the motor generator 10 is operated as a motor, the inverter device 12 converts the electric energy from the battery 15 into AC power which is then supplied to the motor generator 10 to assist the hydraulic pump 6 in drive.

The inverter device 13 provides drive control of the swing motor 16 on the basis of the output from the vehicle body controller 11. The inverter device 13 converts the electric power output from at least one of the motor generator 10 and the electric storage device 15 into AC power which is then supplied to the swing motor 16.

The chopper 14 controls the voltage of a DC power line to which the inverters 12 and 13 are connected. The battery (electric storage device) 15 supplies electric power to the inverters 12 and 13 via the chopper 14, and stores the electric energy generated by the motor generator 10, or regenerated by a generator 25 and by the swing motor 16. The electric storage device may be a capacitor, for example, other than the battery 15. Both the capacitor and the battery may also be used together as the electric storage device. Adopted as the electric storage device, the battery could accumulate significantly more power than the capacitor and is therefore expected to boost work efficiency and save more energy.

Figure 3:
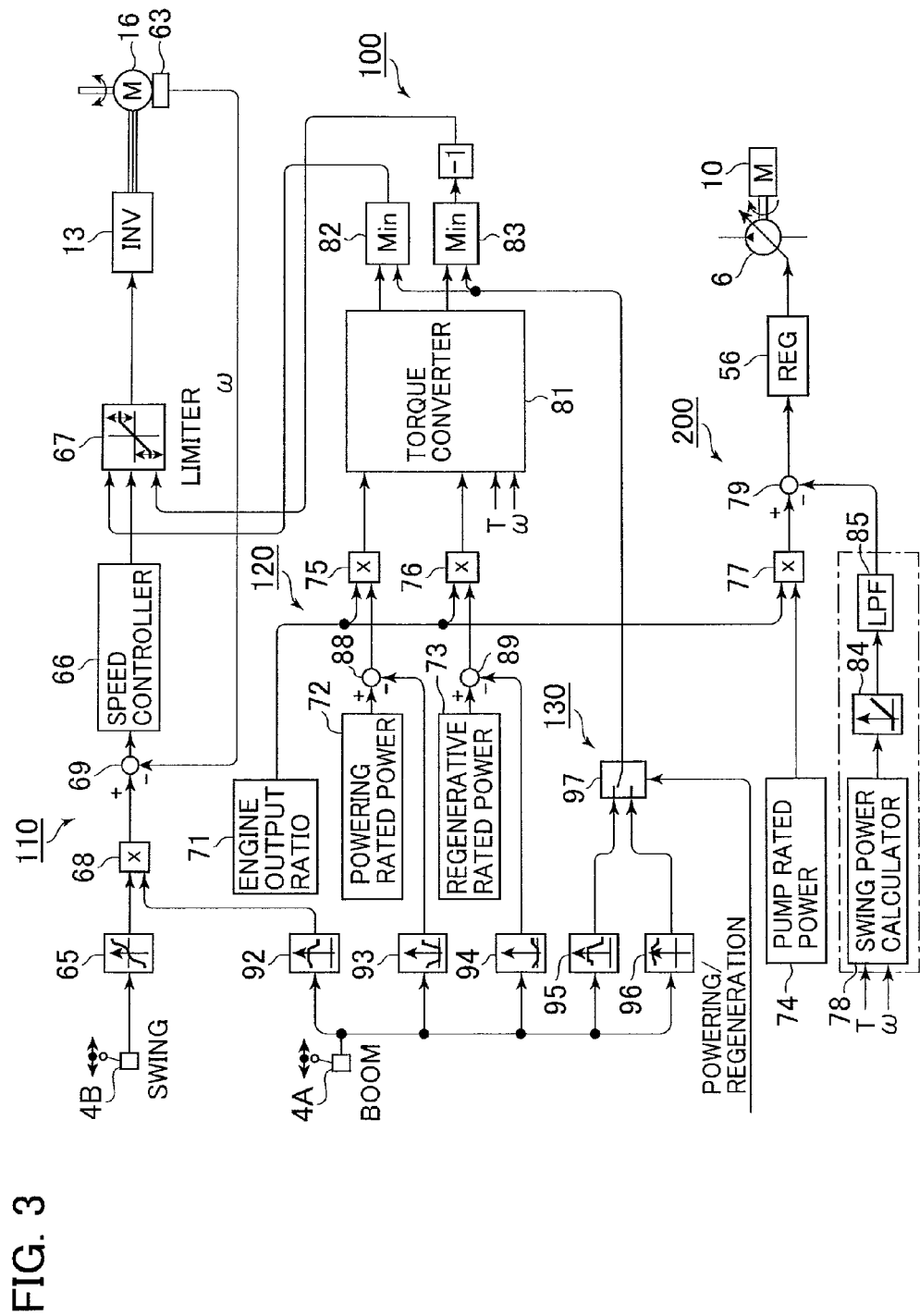
FIG. 3 is a block diagram of processes performed by a vehicle body controller 11 in an embodiment of the invention.

FIG. 3 is a block diagram of processes executed by the vehicle body controller 11 in an embodiment of the invention. The block diagram in this drawing includes a swing control system 100 for controlling the drive of the swing motor 16, and a pump capacity control system 200 for limiting the capacity of the hydraulic pump 6.

The swing control system 100 includes a speed limit value calculation system 110 for calculating the speed limit value (speed upper limit) of the swing motor 16, a power limit value calculation system (power limit value calculation unit) for calculating the power limit value (power upper limit) of the swing motor 16, and a torque limit value calculation system 130 for counting the maximum torque of the swing motor 16.

The speed limit value calculation system 110 includes a speed converter 65, a speed correction gain calculator 92, a multiplier 68, a subtractor 69, and a speed controller 66.

The speed converter 65 is a part that converts the operation amount (operation signal) input to the operating device 4B via the pressure sensors 20a and 20b into the swing speed of the swing motor 16. The speed converter 65 of this embodiment defines a relation between the operation amount and the swing speed in the function shown in FIG. 3. In a graph depicting the function, the horizontal axis denotes the operation amount of the operating device 4B and the vertical axis represents the swing speed of the swing motor 16 (upper swing structure 1d). On the horizontal axis, the positive direction (rightward direction) denotes the operation amount in the clockwise swing direction and the negative direction (leftward direction) indicates the operation amount in the counterclockwise swing direction. On the vertical axis, the positive direction (upward direction) represents the speed during clockwise swing and the negative direction (downward direction) shows the speed during counterclockwise swing. In this embodiment as depicted in this drawing, an approximate proportionality is established in which the swing speed rises in accordance with the growing operation amount. The swing speed calculated by the speed converter 65 is output to the multiplier 68.

The speed correction gain calculator 92 is a part that calculates the correction gain for the swing speed of the swing motor 16 on the basis of the operation amount of the operating device 4A that is input via the pressure sensors 17a and 17b. The correction gain calculator 92 of this embodiment defines the relation between the operation amount and the correction gain in a function shown in FIG. 3. In a graph depicting the function, the horizontal axis denotes the operation amount of the operating device 4A and the vertical axis represents the correction gain. On the horizontal axis, the positive direction (rightward direction) denotes the operation amount in the boom raising direction, the negative direction (leftward direction) indicates the operation amount in the boom lowering direction, and zero shows the control lever being in the neutral position. The correction gain calculated by the speed correction gain calculator 92 is output to the multiplier 68.

What follows is an explanation of the relation between the operation amount and the correction amount in connection with the speed correction gain calculator 92 of this embodiment. As shown in the graph in FIG. 3, when the operation amount of the operating device 4A is zero, the correction gain is configured to be "1" as a maximum value so that no speed correction is made with the operation amount. That is, when the swing operation alone is carried out by the operating device 4B, the swing speed is not corrected. When the operation amount increases in the boom raising direction, the correction gain is configured to be smaller than 1 at the time a predetermined operation amount is exceeded. If the operation amount further enlarges, the correction gain converges on a constant value (e.g., 0.6). When the operation amount increases in the boom lowering direction, the correction gain is also configured to be smaller than 1 at the time a predetermined operation amount is exceeded. The correction gain ends up with a constant value {e.g., 0.8 (larger than the convergence value at the time of boom raising)}.

Since the power and the movement required for raising the boom and those for lowering the boom are considerably different, it is preferred that the convergence value of the correction gain for boom raising be different from that for boom lowering. With this point taken into account, this embodiment is arranged to set the convergence value of the correction gain for boom raising to be smaller than that for boom lowering. As a result, the function shown in the graph gives an asymmetrical shape with the vertical axis as the center. The same holds for the correction amount calculators 93 and 94 as well as for the torque limit value calculators 95 and 96.

The multiplier 68 is a part that multiplies the swing speed output from the speed converter 65 by the correction gain output from the correction gain calculator 92. The correction gain is used to correct the swing speed to a smaller value when the operating devices 4A and 4B are operated simultaneously (when the swing boom is raised or lowered). Because the larger the increase in the operation amount of the operating device 4A is, the smaller the correction gain becomes, the swing speed is lower as the operation amount increases. The swing speed calculated by the multiplier 68 is output to the subtractor 69.

The subtractor 69 is a part that subtracts the actual swing speed (real speed) ω of the swing motor 16 from the swing speed (target speed) output from the multiplier 68 to calculate the deviation therebetween. The real speed ω is output from a speed sensor (speed detection means) 63 that detects the actual swing speed of the swing motor 16. The speed deviation thus calculated by the subtractor 69 is output to the speed controller 66.

The speed controller 66 is a part that generates a torque command to the swing motor 16 (inverter device 13) such that the speed deviation output from the subtractor 69 becomes smaller (i.e., so that the real speed ω will follow the target speed). The torque command generated here is output to a torque limiter 67 and is put a limit on it as needed.

As explained above, the speed limit value calculation system 110 of this embodiment is configured in such a manner that the speed limit value of the swing motor 16 is raised in proportion to the growing operation amount of the operating device 4A (so as to lower the maximum swing speed) when the operating devices 4A and 4B are operated simultaneously.

A power limit value calculation system 120 includes a power-running correction amount calculator 93, a regenerative power correction amount calculator 94, a powering rated power storage unit 72, a regenerative rated power storage unit 73, a subtractor 88, a subtractor 89, an engine output ratio calculation unit 71, a multiplier 75, a multiplier 76, and a torque converter 81.

The power-running correction amount calculator 93 is a part that calculates a correction amount of the power of the swing motor 16 in a powering operation on the basis of the operation amount of the operating device 4A input via the pressure sensors 17a and 17b. The operation amount of the operating device 4A (i.e., sensor values from the pressure sensors 17a and 17b) may be arranged to be input to the power-running correction amount calculator 93 only when the swing motor 16 is in the powering operation. For the correction amount calculator 93 of this embodiment, a function shown in FIG. 3 defines the relation between the operation amount and the correction amount. In the graph of the function, the horizontal axis denotes the operation amount of the operating device 4A and the vertical axis shows the correction amount. As in the case of the speed correction gain calculator 92, on the horizontal axis, the positive direction indicates the operation amount in the boom raising direction, the negative direction denotes the operation amount in the boom lowering direction, and zero shows the control lever being in the neutral position. The correction amount calculated by the correction amount calculator 93 is output to the subtractor 88.

What follows is an explanation of the relation between the operation amount and the correction amount regarding the power-running correction amount calculator 93 of this embodiment. As shown in the graph in FIG. 3, when the operation amount of the operating device 4A is zero, the correction amount is also configured to be zero so that no power correction is carried out. That is, when only the swing operation is performed with the operating device 4B, the swing power is not corrected. When the operation amount increases in the boom raising direction, the correction amount is set to shift from zero to a larger value at the time a predetermined operation amount is exceeded. The correction gain converges on a constant value with the operation amount further raised. On the contrary, the rise in the operation amount in the boom lowering direction makes the correction amount shift from zero to a larger value at the time a predetermined operation amount is exceeded. Eventually, the correction amount converges on a constant value (configured to be smaller than the convergence value upon boom raising).

The subtractor 88 is a part that calculates a power upper limit of the swing motor 16 in the powering operation by subtracting the correction amount output from the power-running correction amount calculator 93 from the rated power of the swing motor 16 in the powering operation stored in the powering rated power storage unit 72. The power-running upper limit calculated here is output to the multiplier 75.

The multiplier 75 is a part that corrects the power operation power upper limit in accordance with engine output (power) by multiplying the power-running upper limit output from the subtractor 88 by an engine output ratio. In this context, the "engine output ratio" refers to the ratio of the current output with regard to the rated output of the engine 7. The current output can be input from the engine controller 21. The power-running upper limit calculated by the multiplier 75 is output to the torque converter 81.

The regenerative power correction amount calculator 94 is a part that calculates a correction amount of the power of the swing motor 16 in a regenerative operation on the basis of the operation amount of the operating device 4A input via the pressure sensors 17a and 17b. The operation amount of the operating device 4A (sensor values from the pressure sensors 17a and 17b) may be arranged to be input to the regenerative power correction amount calculator 94 only when the swing motor 16 is in the regenerative operation. For the correction amount calculator 94 of this embodiment, a function shown in FIG. 3 defines the relation betwe'en the operation amount and the correction amount. In the graph of the function, the horizontal axis denotes the operation amount of the operating device 4A and the vertical axis represents the correction amount. As in the case of the correction amount calculator 94, on the horizontal axis, the positive direction indicates the operation amount in the boom raising direction, the negative direction denotes the operation amount in the boom lowering direction, and zero represents the control lever being in the neutral position. The correction amount calculated by the correction amount calculator 94 is output to the subtractor 89.

Explained below is the relation between the operation amount and the correction amount regarding the regenerative power correction amount calculator 94 of this embodiment. As shown in the graph in FIG. 3, when the operation amount of the operating device 4A is zero, the correction amount is also configured to be zero so that no power correction is carried out. That is, when only the swing operation is performed with the operating device 4B, the swing power is not corrected. The rise in the operation amount in the boom raising direction makes the correction amount shift from zero to a larger value at the time a predetermined operation amount is exceeded. With the operation amount further raised, the correction gain is set to converge on a constant value. On the contrary, when the operation amount increases in the boom lowering direction, the correction amount is also set to shift from zero to a larger value at the time a predetermined operation amount is exceeded. Eventually, the correction amount converges on a constant value (configured to be smaller than the convergence value upon boom raising). As is clear from FIG. 3, the correction amount for regenerative operation is configured to be smaller than that for powering operation.

This setting is intended to relatively lower the power limit amount in the regenerative operation so that the braking power in the regenerative operation (regenerative brake) will not be excessively limited and that the operator will retain a good operational feeling at deceleration.

The subtractor 89 is a part that calculates a power upper limit of the swing motor 16 in the regenerative operation by subtracting the correction amount output from the regenerative power correction amount calculator 94 from the rated power of the swing motor 16 in the regenerative operation stored in the regenerative rated power storage unit 73. The regenerative power upper limit calculated here is output to the multiplier 76.

The multiplier 76 is a part that corrects the regenerative power upper limit in accordance with engine output by multiplying the regenerative power upper limit output from the subtractor 89 by the engine output ratio. The regenerative power upper limit calculated by the multiplier 76 is output to the torque converter 81.

The torque converter 81 is a part that converts the power upper limits (i.e., power-running upper limit and regenerative power upper limit) to torque. A torque command T to the inverter device 13 (swing motor 16) and the actual swing speed ω of the swing motor 16 are input to the torque converter 81. In this embodiment, the power upper limits input from the multipliers 75 and 76 are corrected with the revolution speed (swing speed co) of the swing motor 16 for conversion to torque upper limits under control. The torque upper limits calculated by the torque converter 81 are output to minimum value selectors 82 and 83.

As explained above, in the power limit value calculation system 120 of this embodiment, when the operating devices 4A and 4B are operated simultaneously, power limit values are set separately depending on whether the swing motor 16 is in the powering or regenerative operation. With the operating devices 4A and 4B operated simultaneously, the power limit value of the swing motor 16 is configured to increase (such that the power upper limit will decrease) in proportion to the growing operation amount of the operating device 4A. Furthermore, the power limit value of the swing motor 16 at this point is set to increase in proportion to the rise in engine output (such that the power upper limit will decrease).

The torque limit value calculation system 130 includes a powering torque limit calculator 95, a regenerative torque limit calculator 96, and a selector 97.

The powering torque limit calculator 95 is a part that calculates maximum torque of the swing motor 16 in the powering operation on the basis of the operation amount of the operating device 4A input via the pressure sensors 17a and 17b. For the powering torque limit calculator 95 of this embodiment, a function shown in FIG. 3 defines the relation between the operation amount and the maximum torque. In the graph of the function, the horizontal axis indicates the operation amount of the operating device 4A and the vertical axis represents the maximum torque. On the horizontal axis, the positive direction denotes the operation amount in the boom raising direction, the negative direction represents the operation amount in the boom lowering direction, and zero shows the control lever being in the neutral position. The correction gain calculated by the powering torque limit calculator 95 is output to the selector 97.

Explained below is the relation between the operation amount and the maximum torque regarding the powering torque limit calculator 95 of this embodiment. As shown in the graph in FIG. 3, when the operation amount of the operating device 4A is zero, the maximum torque is configured to be maximum (i.e., a state in which there are no constraints stemming from the operation amount) so that torque is not limited by means of the operation amount. That is, when only the swing operation is performed with the operating device 4B, the maximum torque is not restricted. With the operation amount increasing in the boom raising direction, the maximum torque is configured to be smaller than the maximum value at the time a predetermined operation amount is exceeded. The maximum torque converges on a constant value if the operation amount further rises. When the operation amount increases in the boom lowering direction, the maximum torque is also configured to be smaller than the maximum value at the time a predetermined operation amount is exceeded. Eventually, the maximum value converges on a constant value (configured to be larger than the convergence value at the time of boom raising).

The regenerative torque limit calculator 96 is a part that calculates maximum torque of the swing motor 16 in the regenerative operation on the basis of the operation amount of the operating device 4A input via the pressure sensors 17a and 17b. For the regenerative torque limit calculator 96 of this embodiment, a function shown in FIG. 3 defines the relation between the operation amount and the maximum torque. In the graph of the function, the horizontal axis denotes the operation amount of the operating device 4A and the vertical axis shows the maximum torque. On the horizontal axis, the positive direction indicates the operation amount in the boom raising direction, the negative direction represents the operation amount in the boom lowering direction, and zero shows the control lever being in the neutral position. The correction gain calculated by the regenerative torque limit calculator 96 is output to the selector 97.

What follows is an explanation of the relation between the operation amount and the maximum torque regarding the regenerative torque limit calculator 96 of this embodiment. As shown in the graph in FIG. 3, when the operation amount of the operating device 4A is zero, the maximum torque is set to maximum (i.e., a state in which there are no constraints stemming from the operation amount) so that torque is not limited by means of the operation amount. That is, when only the swing operation is performed using the operating device 4B, the maximum torque is not limited. With the operation amount increasing in the boom raising direction, the maximum torque is configured to be smaller than the maximum value at the time a predetermined operation amount is exceeded. The maximum torque is set to converge on a constant value if the operation amount further rises. On the other hand when the operation amount increases in the boom lowering direction, the maximum torque is also configured to be smaller than the maximum value at the time a predetermined operation amount is exceeded. Eventually, the maximum torque converges on a constant value (configured to be larger than the convergence value upon boom raising). As is clear from FIG. 3, the maximum torque for regenerative operation is configured to be larger than that for powering operation. This setting is intended to relatively increase the maximum torque in the regenerative operation so that the regenerative brake will not be excessively restrained and that the operator will retain a good operational feeling at deceleration.

The selector is a part that selects the maximum torque to be output to the minimum value selector 82 or to the minimum value selector 83 depending on whether the swing motor 16 is in the powering or regenerative operation. When the swing motor 16 is in the powering operation, the selector 97 outputs the maximum torque input from the powering torque limit calculator 95 to the minimum value selector 82. Conversely, when the swing motor 16 is in the regenerative operation, the selector 97 outputs the maximum torque input from the regenerative torque limit calculator 96 to the minimum value selector 83.

The minimum value selector 82 is a part that makes a comparison between the torque upper limit input from the multiplier 75 via the torque converter 81 (i.e., the value resulting from torque conversion of the power upper limit in the powering operation) and the maximum torque input from the powering torque limit calculator 95 via the selector 97, before outputting the smaller of the two limits to the torque limiter 67 as the ultimate torque upper limit. In the regenerative operation, no maximum torque is input from the selector 97. In this case, the torque upper limit input from the torque converter 81 is output to the torque limiter 67.

The minimum value selector 83 is a part that makes a comparison between the torque upper limit input from the multiplier 76 via the torque converter 81 (i.e., the value resulting from torque conversion of the power upper limit in the regenerative operation) and the maximum torque input from the regenerative torque limit calculator 96 via the selector 97, before outputting the smaller of the two limits to the torque limiter 67 as the ultimate torque upper limit. At this point in this embodiment, a minus sign is attached to the torque upper limit for regenerative operation before the limit is output to the torque limiter 67. In the regenerative operation, no maximum torque is input from the selector 97. In this case, the upper torque limit input from the torque converter 81 is output to the torque limiter 67.

The torque limiter 67 is a part that puts a limit on the torque command generated by the speed controller 66 (i.e., the process of lowering the torque command output from the speed controller 66 as needed), thereby generating an ultimate torque command T to be output to the inverter device 13. Specifically, at times of the limit to the torque command from the speed controller 66, the torque limiter 67 utilizes the torque upper limit from the minimum value selector 82 as the torque upper limit in the positive direction, and the torque upper limit from the minimum value selector 83 as the torque upper limit in the negative direction. The torque command T limited as needed by the torque limiter 67 is output to the inverter device 13. The inverter device 13 drives the swing motor 16 in such a manner that the real torque of the swing motor 16 follows the torque command T input from the torque limiter 67. A method of detecting the actual torque of the swing motor 16 involves measuring the value of the current to the swing motor 16 by an ammeter or the like and calculating the real torque from the measured value.

With the torque limit value calculation system 130 of this embodiment, as explained above, when the operating devices 4A and 4B are operated simultaneously, the torque limit value of the swing motor 16 is set to increase in proportion to the growing operation amount of the operating device 4A (so that the maximum torque will decrease).

The pump capacity control system 200 includes a hydraulic pump rated power storage unit 74, a multiplier 77, a swing power calculator 78, a pump power converter 84, a filter circuit 85, and a subtractor 79.

The hydraulic pump rated power storage unit 74 stores the power (rated power) of the hydraulic pump when the engine 7 provides rated output. This rated power is output to the multiplier 77. The multiplier 77 multiplies the rated power output from the hydraulic pump rated power storage unit 74 by the engine output ratio to calculate the pump power corresponding to the engine output under control. The result of the calculation by the multiplier 77 is output to the subtractor 79.

The swing power calculator 78 is a part that calculates the power of the swing motor 16 under control on the basis of the torque command T and real speed co. The torque command T calculated by the torque limiter 67 and the real speed ω detected by the speed sensor 63 are input to the swing power calculator 78. The power of the swing motor 16 calculated by the swing power calculator 78 is converted to a value corresponding to the power of the hydraulic pump 6 by the pump power converter 84. The value from the conversion is further subject to a low-pass filtering process of the filter circuit 85 before being output to the subtractor 79. The process here is intended to prevent the occurrence of insufficient output of the engine 7 by correcting (i.e., reducing) the pump power by the amount corresponding to the power dissipation caused by the swing. For this reason, the pump power converter 84 of this embodiment only calculates power in the powering operation and gives a zero result in the regenerative operation. The filter circuit 85 may be omitted.

The subtractor 79 subtracts the pump power output from the filter circuit 85 from the pump power output from the multiplier 77. On the basis of the pump power calculated by the subtractor 79, the regulator 56 controls the capacity of the hydraulic pump 6. In this manner, the value obtained by subtracting the power corresponding to the swing power from the engine output is assigned to the pump power, so that insufficient engine output will be inhibited.

What follows is an explanation of the workings of the hydraulic excavator structured as described above.

<Swing-Only Operation>

Explained first is how the swing-only operation is carried out. The swing operation is performed by the operating device 4B but no boom operation is carried out by the operating device 4A. Thus, the operation amount of the operating device 4A is zero. It follows that the swing speed is not corrected by the speed limit value calculation system 110. That is, the speed correction gain calculator 92 outputs 1 as the correction gain, and the multiplier 68 calculates the target speed of the swing motor 16 with no change in the output value of the speed converter 65 calculated in accordance with the operation amount of the operating device 4B. The speed controller 66 generates the torque command on the basis of the target speed and outputs the generated command to the torque limiter 67.

Meanwhile in the power limit value calculation system 120, when the operation amount of the operating device 4A is zero, the power-running correction amount calculator 93 and regenerative power correction amount calculator 94 output zero as the correction amount. Thus the power upper limit is not corrected on the basis of the operation amount. However, if the engine output is lower than the rating, the multipliers 75 and 76 decrease the power upper limit in accordance with the engine output ratio, the lowered power upper limit being output to the torque converter 81 (if the engine output is as rated, the power will not be limited by the power limit value calculation system 120). The power upper limit output to the torque converter 81 is converted thereby to a torque upper limit fit for the real speed of the swing motor 16 under control before being output to the minimum value selectors 82 and 83.

Also in the torque limit value calculation system 130, when the operation amount of the operating device 4A is zero, the powering torque limit calculator 95 and regenerative torque limit calculator 96 each output a maximum value as the maximum torque value. The maximum torque therefore is not corrected on the basis of the operation amount. The selector 97 then selects the maximum torque depending on whether the swing motor 16 is in the powering or regenerative operation, and outputs the selected maximum torque to the minimum value selectors 82 and 83. The minimum value selectors 82 and 83 compare the torque upper limit input via the power limit value calculation system 120 with the maximum torque input via the torque limit value calculation system 130, and output the lower torque to the torque limiter 67 as the ultimate torque upper limit.

Figure 4:
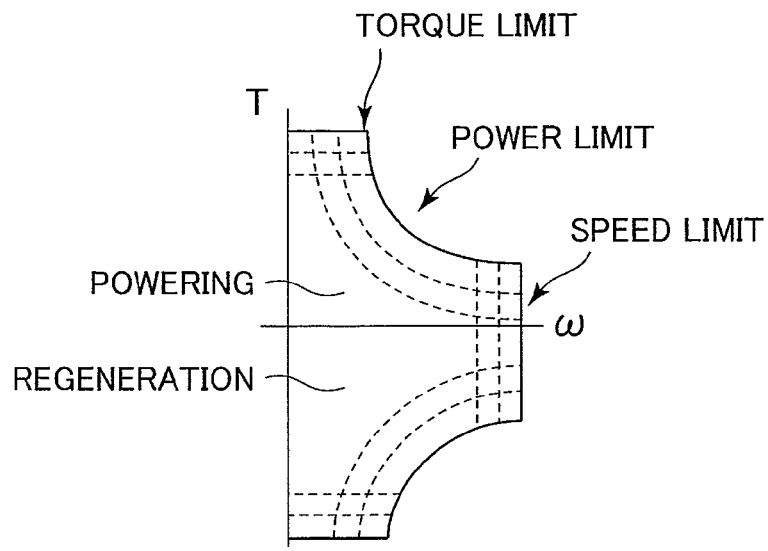
FIG. 4 is an illustration showing changes in a torque command T when a swing-only operation is performed on the hydraulic excavator in an embodiment of the invention.

FIG. 4 is an illustration showing changes in a torque command T when a swing-only operation is performed on the hydraulic excavator in an embodiment of the invention. In this drawing it is assumed that the engine output is as rated and the power is not limited by the power limit value calculation system 120. In this case as explained above, there is no limit on the maximum swing speed, the power value, or the maximum torque of the swing motor 16 on the basis of the operation amount of the operating device 4A. Thus the torque command T is restricted to values indicated below solid lines in FIG. 4. That is, the swing motor 16 in a swing-only operation accelerates rapidly at its start-up with no limit put on the torque in accordance with the operation amount. The maximum swing speed is not subject to constraints stemming from the operation amount either.

Meanwhile, in the pump capacity control system 200, the swing power calculator 78, pump power converter 84, and filter circuit 85 calculate the pump power corresponding to the swing power, and subtract the calculated pump power from the hydraulic pump rated power to obtain the ultimate hydraulic pump power. The regulator 56 controls the capacity of the hydraulic pump 6, and the power of the hydraulic pump 6 is restricted within the power upper limit calculated by the subtractor 79.

As described above the swing speed in the swing-only operation is not constrained when the engine output is as rated. Nor is the swing operation subject to torque limits at the time of acceleration and deceleration. With the engine output below the rating, on the contrary, the power upper limit fluctuates in accordance with the engine output ratio. When the power upper limit exceeds the maximum torque (i.e., the value calculated by the torque limit value calculation system 130), the torque limiter 67 acts to limit the torque and dampen acceleration and deceleration, resulting in the swing motor 16 operating within the power upper limit.

<Swing-Boom Raising Combined Motion>

Explained next is how the swing-boom raising is operated. Take, for example, the case in which the cargo inside the bucket of the hydraulic excavator is to be loaded onto the bed of a dump track. In this case, the operator moves the control levers of the operating devices 4A and 4B from their neutral positions to their positions of the maximum operation amount with no stop. This causes the speed correction gain calculator 92 in the speed limit value calculation system 110 to output a value smaller than 1 as the correction gain. The output value of the speed converter 65 calculated in accordance with the operation amount of the operating device 4B is then reduced by the correction gain before being output from the multiplier 68. The speed controller 66 generates a torque command on the basis of the difference between the target speed output from the multiplier 68 and the real speed co, and outputs the generated command to the torque limiter 67. That is, when the operating devices 4A and 4B are operated simultaneously, the vehicle body controller 11 limits the maximum swing speed of the swing motor 16 as per the operation amount of the operating device 4A.

Meanwhile in the power limit value calculation system 120, the power-running correction amount calculator 93 and regenerative power correction amount calculator 94 each output a maximum value as the correction amount when the operation amount of the operating device 4A in the boom raising direction is maximal. Thus the subtractors 88 and 89 each set the power upper limit based on the operation amount to a minimum value. When the engine output is lower than the rating, the multipliers 75 and 76 further lower the power upper limit in accordance with the engine output ratio, the lowered power upper limit being output to the torque converter 81 (if the engine output is as rated, the power is not limited by the power limit value calculation system 120). The power upper limit output to the torque converter 81 is converted thereby to a torque upper limit fit for the real speed ω before being output to the minimum value selector 82 and 83. That is, when the operating devices 4A and 4B are operated simultaneously, the vehicle body controller 11 limits the power of the swing motor 16 in accordance with the operation amount of the operating device 4A.

In the torque limit value calculation system 130, when the operation amount of the operating device 4A in the boom raising direction is maximal, the powering torque limit calculator 95 and regenerative torque limit calculator 96 each output a minimum value as the maximum torque value. The selector 97 selects the maximum value depending on whether the swing motor 16 is in the powering or regenerative operation, and outputs the selected maximum torque to the minimum value selectors 82 and 83. That is, when the operating devices 4A and 4B are operated simultaneously, the vehicle body controller 11 limits the maximum torque of the swing motor 16 in accordance with the operation amount of the operating device 4A.

The minimum value selectors 82 and 83 compare the torque upper limit input via the power limit value calculation system 120 with the maximum torque input via the torque limit value calculation system 130, and output the lower torque to the torque limiter 67 as the ultimate torque upper limit.

<Swing-Boom Lowering Combined Motion>

Explained next is how the swing-boom lowering operation is carried out. Basically as in the swing-boom raising operation, the maximum torque, power, and maximum swing speed of the swing motor 16 are limited in accordance with the operation amount of the operating device 4A. However, as already mentioned above, there are significant differences between the boom raising operation and the boom lowering operation in terms of the required power and movements even though what is moved is the same component (i.e., boom). This is because the required power and movements differ depending on whether the cargo is raised or lowered relative to deadweight. Thus, at the time of swing boom lowering operation it is preferred to perform the compensation of which the characteristics are different from those of the compensation applied to the swing boom raising operation.

In view of the above point, this embodiment has the speed correction gain calculator 92, correction amount calculators 93 and 94, and torque limit value calculators 95 and 96 set with different calculated values depending on whether the boom 1a is raised (extending operation of the boom cylinder 3a) or lowered (contracting operation of the boom cylinder 3a) (i.e., the calculated values have characteristics varying with the operation direction of the operating device 4A). Specifically, as shown in each graph in FIG. 3, the limit value for raising the boom is configured to be larger than that for lowering it. The function shown in each of the graphs in FIG. 3 appears asymmetrical with the vertical axis on the center. When the compensation is given different characteristics depending on the movement of the boom as above, it is possible to use the limit value fit for each of the movements and thereby further improve the operational feeling.

Pump power control performed by the pump capacity control system 200 in the combined motion is the same as in the swing-only operation and thus will not be discussed further.

Figure 5:
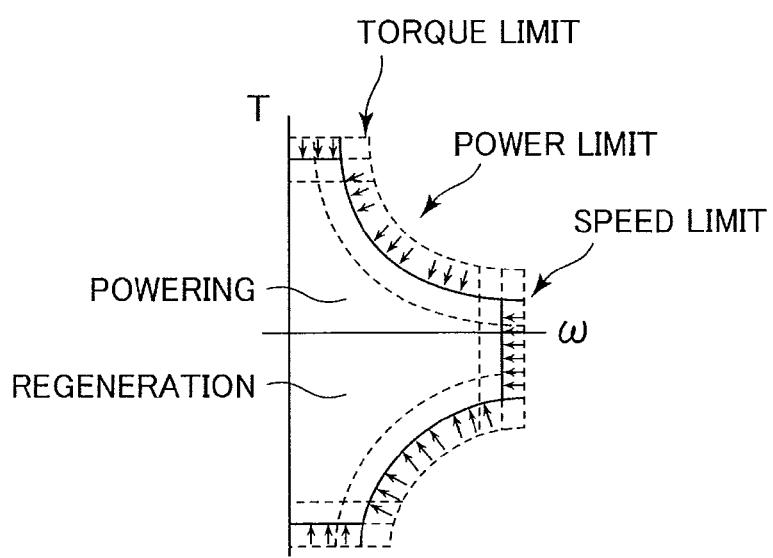
FIG. 5 is an illustration showing changes in the torque command T when a swing operation and a boom operation (minute operation) are performed simultaneously on the hydraulic excavator in an embodiment of the invention.
Figure 6:
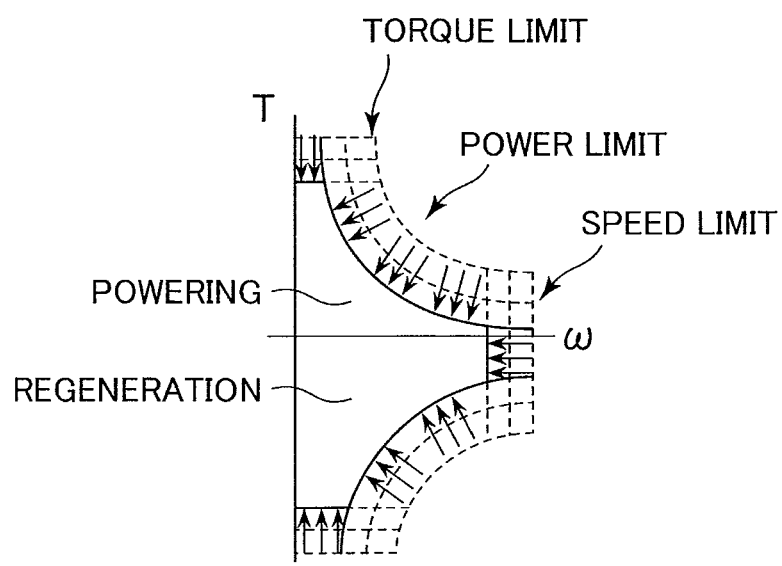
FIG. 6 is an illustration showing changes in the torque command T when a swing operation and a boom operation (maximum operation) are performed simultaneously on the hydraulic excavator in an embodiment of the invention.

FIGS. 5 and 6 are illustrations showing changes in the torque command T when the swing operation and the boom operation are performed simultaneously (in combined motion) on the hydraulic excavator in an embodiment of the invention. FIG. 6 shows the case where the operation amount for the boom operation is maximal (maximum operation), and FIG. 5 depicts the case where the operation amount is smaller than in the case of FIG. 6 (e.g., minute operation).

As shown in these drawings, the larger the operation amount of the operating device 4A is, the greater the limits on the maximum swing speed, power, and maximum torque of the swing motor 16 become. Therefore, the swing motor 16 in the combined operation first accelerates under constraints of maximum torque, then gains speed under the influence of the limit on torque as per the power upper limit, and eventually swings at a maximum speed more limited than in the swing-only operation.

As explained above, when the combined swing operation is performed in this embodiment, the power limit value calculation system 120 calculates the power limit value of the swing motor 16 in accordance with the operation amount of the operating device 4A, and controls the power of the swing motor 16 on the basis of the power limit value thus calculated.

Where the power of the swing motor 16 is controlled in this manner, the power of the hydraulic pump 6 can also be regulated on the basis of the power of the swing motor 16. This makes it easier to adjust a balance between the two kinds of power and thereby to match the operating speeds of both the swing motor 16 and the boom cylinder 3a in a manner similar to what is practiced on conventional hydraulic excavators. As a result, this embodiment allows a good operational feeling to be kept in the combination operation by so-called hybrid work machines. This embodiment in particular provides control in such a manner that the swing speed ω is in inverse proportion to the torque command T (see FIGS. 4, 5, and 6), which keeps the power during acceleration (i.e., energy change ratio) constant. That in turn offers the distinctive benefit of maintaining a good match of the two operating speeds until the swing speed of the swing motor 16 reaches its maximum value.

The work machine disclosed in the above-cited document (WO 2007/052538) is expected to provide a good operational feeling when the engine output (absorption torque of the hydraulic pump) is guaranteed to the extent that the boom raising speed matches the swing speed. However, when the engine output drops below the predetermined value (e.g., when the operator lowers the engine revolutions in order to reduce noise generation), the absorption torque of the hydraulic pump becomes relatively lower than in the earlier state. This can lead to a fear that a drop in the boom raising speed may disturb the balance with the swing speed.

The multipliers 75 and 76, by contrast, limit the power of the swing motor 16 in accordance with the engine output in this embodiment when the engine output is lower than the rated output in the swing-boom raising operation. A good match thereby can be maintained between the boom raising speed and the swing speed even when the engine output fluctuates. That is, a good operational feeling can be retained in the combined motion regardless of the operating state of the engine.

Furthermore, as explained above, the power of the hydraulic pump 6 under control of the pump capacity control system 200 is given as the rated pump power minus the amount of the power consumed by the swing motor 16. This allows the two components to influence each other in the combined operation. Regulating the balance therebetween additionally makes it possible to adjust the operation in such a manner as to be fit for the work.

Figure 8:
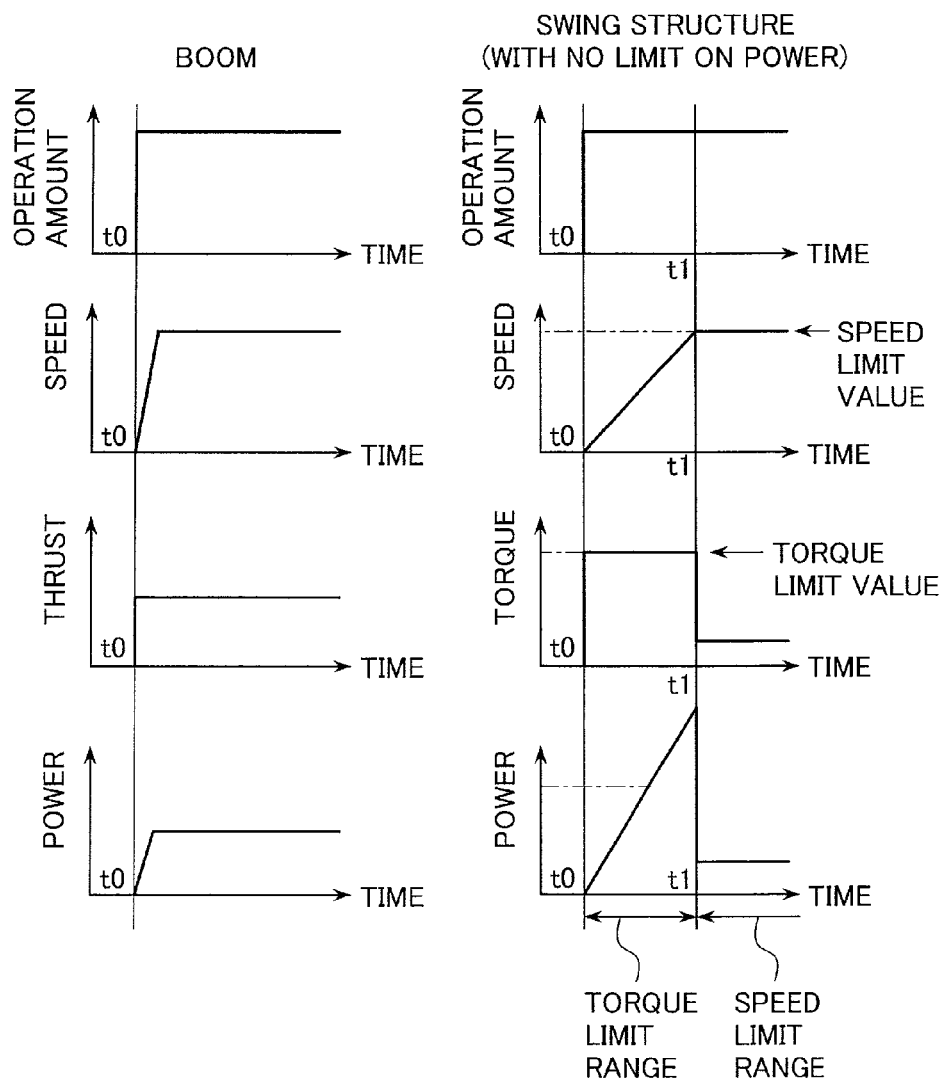
FIG. 8 is a set of illustrations showing how the swing boom is raised on a hydraulic excavator as a comparative example with regard to the present invention.
Figure 9:
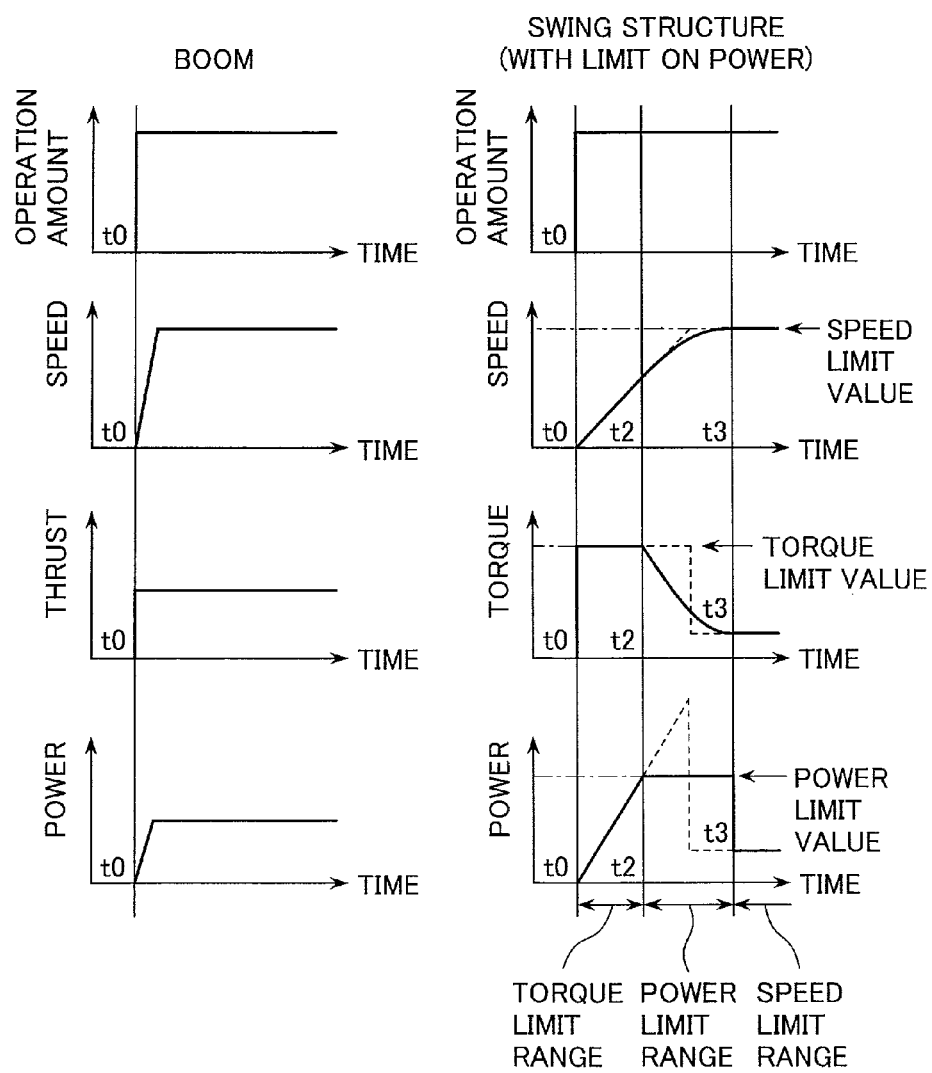
FIG. 9 is a set of illustrations showing how the swing boom is raised on the hydraulic excavator in an embodiment of the invention.

What follows is a comparative example given here to highlight the effects of the hydraulic excavator in the embodiment. FIG. 8 is a set of illustrations showing how the swing boom is raised on a hydraulic excavator in the comparative example of the present invention. FIG. 9 is a set of illustrations showing how the swing boom is raised on the hydraulic excavator in an embodiment of the invention. The hydraulic excavator of the comparative example in FIG. 8 involves only limiting the torque of the swing motor or the speed of it in accordance with the operation amount for the boom raising operation. Unlike the embodiment of this invention, the hydraulic excavator of the comparative example is not subject to the power restriction. It is assumed here, for both cases in FIGS. 8 and 9, that the control lever of the operating device (4A) for raising the boom and the control lever of the operating device (4B) for swinging the boom are operated from their neutral positions all the way to their positions of the maximum operation amount by the operator. FIGS. 8 and 9 depict speed, thrust, and power as the operating aspects of the boom; and speed, torque, and power as the operating aspects of the swing structure (swing motor). The dotted lines in the graphs showing the operating aspects of the swing structure in FIG. 9 correspond to the graphs depicting the operating aspects of the swing structure in FIG. 8.

In the example of FIG. 8, the torque of the swing motor exceeds a limit value immediately after the operator has started the swing-boom raising operation at time t0. The torque limit control is hence performed to maintain the torque at a constant (maximum) value (in the torque limit range). The speed of the swing structure gradually increases and reaches a speed limit value (target speed) at time t1 during this period. The speed limit control is carried out to maintain the speed at a maximum value past time t1. Then, the torque is held at a value smaller than those before time t1 (in the speed limiting range) as a result. Where only the speed and the torque are limited as shown in this drawing, the speed can be limited suddenly at time t1, causing the torque to drop abruptly. In such a case, the swing structure can be impacted and the operator's operational feeling may decline.

In the case of the embodiment shown in FIG. 9, by contrast, torque limit control is performed in the torque limit range immediately after the swing-boom raising operation has started as in the case of FIG. 8. At time t2 before the speed reaches the limit value, power limit control is carried out prior to speed limit control so as to keep the power value constant (in the power limiting range). As a result, past time t2, the torque gradually decreases as the speed of the swing motor 16 increases. The speed can thus be raised in a gradual and smooth manner until the speed limit is reached. Past time t3 when the speed of the swing structure has reached the speed limit, the speed and torque keep constant as in the speed limit range of FIG. 8. In this manner, the embodiment allows the speed to increase gradually by the power restriction before the speed of the swing structure reaches the limit value (maximum value). That in turn hinders the swing structure from getting impacted when the speed is being limited (or when the target speed is reached), thereby improving the operator's operational feeling.

The above case involved the movement of the boom cylinder 3a, a component of a relatively large movement, at the same time as the swing operation. The invention may also be applied to operating other hydraulic actuators such as the arm cylinder 3b and bucket cylinder 3c and still provide the same advantages as those explained above. The invention is also applicable to a case where two or more of a plurality of hydraulic actuators mounted on the hydraulic excavator (work machine) are swung and moved simultaneously. This case is elaborated below in reference to FIG. 7.

Figure 7:
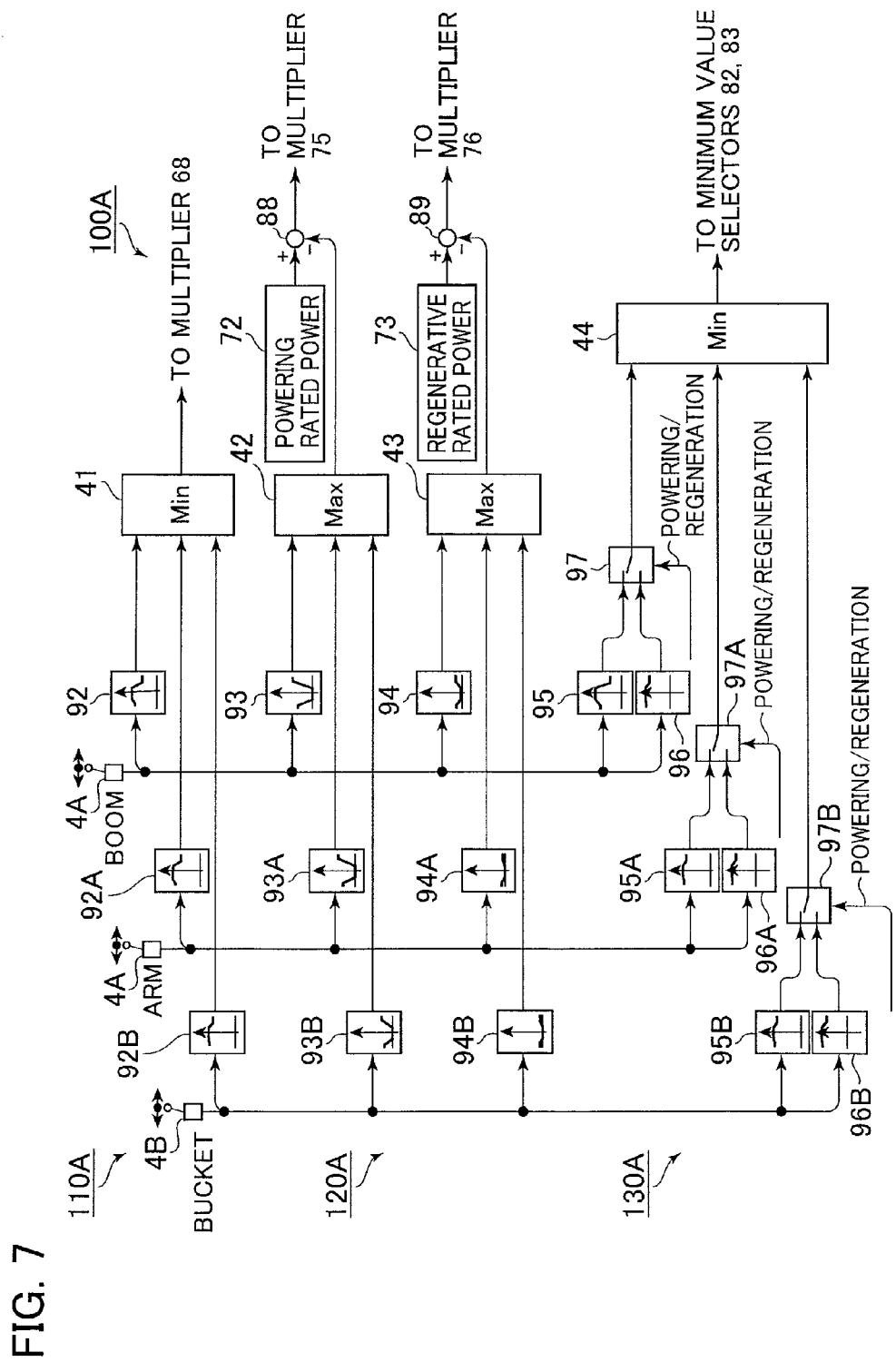
FIG. 7 is a block diagram of processes performed by a swing control system 100A of the vehicle body controller 11 in another embodiment of the invention.

FIG. 7 is a block diagram of processes executed by a swing control system 100A of the vehicle body controller 11 in another embodiment of the invention. The components other than those shown in this drawing are the same as those of the other embodiment depicted in FIG. 3. The swing control system 100A in this drawing includes a speed limit value calculation system 110A, a power limit value calculation system 120A, and a torque limit value calculation system 130A.

The speed limit value calculation system 110A includes a speed correction gain calculator 92, a speed correction gain calculator 92A, and a speed correction gain calculator 92B.

The speed correction gain calculator 92A is a part that calculates a correction gain of the swing speed of the swing motor 16 on the basis of the operation amount of the operating device 4A (operation amount regarding the arm cylinder 3b) input via the pressure sensors 18a and 18b. The speed correction gain calculator 92B is a part that calculates a correction gain of the swing speed of the swing motor 16 on the basis of the operation amount of the operating device 4B (operation amount regarding the bucket cylinder 3c) input via the pressure sensors 19a and 19b. The correction gains output from the speed correction gain calculators 92, 92A, and 92B are output to a minimum value selector 41. In turn, the minimum value selector 41 selects the smallest of the three correction gains and outputs the selected gain to the multiplier 68. This causes the maximum swing speed of the swing motor 16 to be limited in keeping with the largest limit amount.

The power limit value calculation system 120A includes a power-running correction amount calculator 93, a regenerative power correction amount calculator 94, a power-running correction amount calculator 93A, a regenerative power correction amount calculator 94A, a power-running correction calculator 93B, and a regenerative power correction amount calculator 94B.

The power-running correction amount calculator 93A is a part that calculates a correction amount of the power of the swing motor 16 in the powering operation on the basis of the operation amount of the operating device 4A input via the pressure sensors 18a and 18b. The regenerative power correction amount calculator 94A is a part that calculates a correction amount of the power of the swing motor 16 in the regenerative operation on the basis of the operation amount of the operating device 4A input via the pressure sensors 18a and 18b. The power-running correction amount calculator 93B is a part that calculates a correction amount of the power of the swing motor 16 in the powering operation on the basis of the operation amount of the operating device 4B input via the pressure sensors 19a and 19b. The regenerative power correction amount calculator 94B is a part that calculates a correction amount of the power of the swing motor 16 in the regenerative operation on the basis of the operation amount of the operating device 4B input via the pressure sensors 19a and 19b.

The correction amounts output from the power-running correction amount calculators 93, 93A, and 93B are output to a maximum value selector 42. In turn, the maximum value selector 42 selects the largest of the three correction amounts and outputs the selected amount to a subtractor 58. The correction amounts output from the regenerative power correction amount calculators 94, 94A, and 94B are output to a maximum value selector 43. The maximum value selector 43 in turn selects the largest of the three correction amounts and outputs the selected amount to a subtractor 59. This causes the power of the swing motor 16 to be limited in keeping with the largest limit amount.

The torque limit value calculation system 130A includes a powering torque limit calculator 95, a regenerative torque limit calculator 96, a selector 97, a powering torque limit calculator 95A, a regenerative torque limit calculator 96A, a selector 97A, a powering torque limit calculator 95A, a regenerative torque limit calculator 96B, and a selector 97B.

The powering torque limit calculator 95A is a part that calculates the maximum torque of the swing motor 16 in the powering operation on the basis of the operation amount of the operating device 4A input via the pressure sensors 18a and 18b. The regenerative torque limit calculator 96A is a part that calculates the maximum torque of the swing motor 16 in the regenerative operation on the basis of the operation amount of the operating device 4A input via the pressure sensors 18a and 18b. The selector 97A is a part that selects the maximum torque to be output to the minimum value selector 44 from the powering torque limit calculator 95A or from the regenerative torque limit calculator 96A depending on whether the swing motor 16 is in the powering or regenerative operation. The powering torque limit calculator 95B is a part that calculates the maximum torque of the swing motor 16 in the powering operation on the basis of the operation amount of the operating device 4B input via the pressure sensors 19a and 19b. The regenerative torque limit calculator 96B is a part that calculates the maximum torque of the swing motor 16 in the regenerative operation on the basis of the operation amount of the operating device 4B input via the pressure sensors 19a and 19b. The selector 97B is a part that selects the maximum torque to be output to the minimum value selector 44 from the powering torque limit calculator 95B or from the regenerative torque limit calculator 96B depending on whether the swing motor 16 is in the powering or regenerative operation. The maximum torque values output from the selectors 97A and 97B are output to the maximum value selector 44. The maximum value selector 44 then selects the largest of the three maximum torque values and outputs the selected torque value to the minimum value selectors 82 and 83. This causes the maximum torque of the swing motor 16 to be limited in accordance with the largest limit amount.

When the swing control system 100A is configured as explained above, it is possible to limit the maximum swing speed, power, and maximum torque of the swing motor 16 in keeping with the largest limit amount. As a result, a good match can be attained between the operating speed and the swing speed of these components when the arm 1b and bucket 1c other than the boom 1a are operated. It is thus possible to maintain a good match between the operating speed and the swing speed of the hydraulic actuators in this embodiment. As with the previous embodiment, the power of the swing motor 16 is limited in accordance with the operation amount. It follows that a good match can be maintained between the operating speed and the swing speed of the swing motor 16 until the swing speed reaches its maximum value.

The hydraulic excavator was cited as an example in explaining the above embodiments; however, the invention can also be applied to any work machines including other construction machines (e.g., battery type hydraulic excavator driven by battery) as long as they are equipped with hydraulic actuators and electric actuators (components other than the swing motor are also acceptable).

Figure 10:
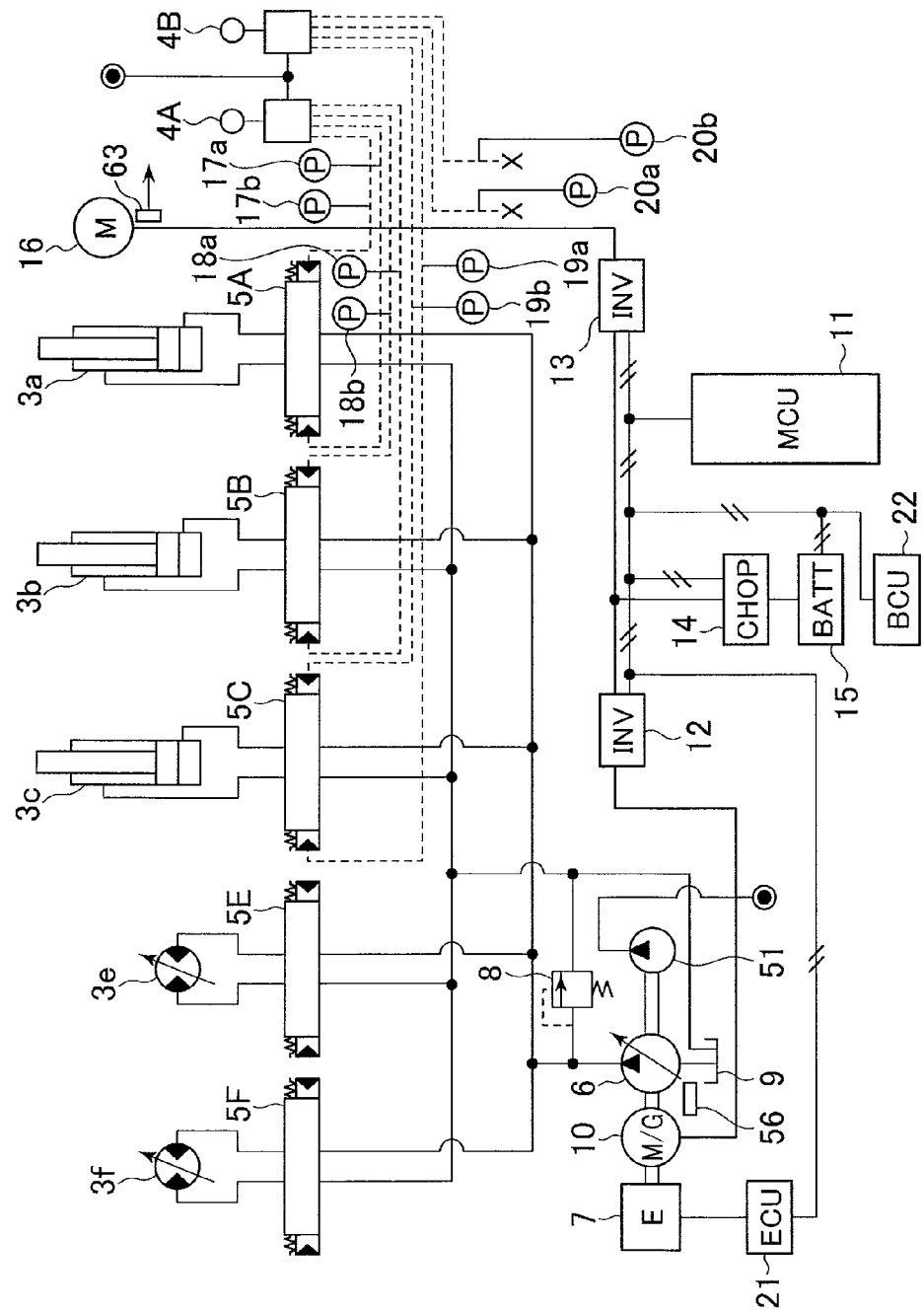
FIG. 10 is a schematic view of another drive control system of the hydraulic excavator in an embodiment of the invention.

The hydraulic circuit shown in FIG. 2 is a tandem circuit that has the hydraulic pump 6 connected serially with the spools of the control valves 5A through 5E related to the hydraulic actuators 3a, 3b, 3c, 3e, and 3f. Nevertheless, it is also possible to configure a parallel circuit in which all spools of the control valves 5A through 5E are connected in parallel with the hydraulic pump 6 as shown in FIG. 10. As another alternative, the hydraulic circuit may be configured by combination of a tandem circuit with a parallel circuit in a suitable manner.

The word "simultaneously" was used to explain a "combined motion" such as the swing-boom raising operation, and a "combined operation" involving the operating device designating such a combined motion in the foregoing paragraphs. The meaning of this word is not limited to indicating the case where a plurality of operations is started simultaneously; the word applies extensively to the above-mentioned case but to ones where a plurality of motions or operations is carried out at the same time.

DESCRIPTION OF REFERENCE NUMERALS

1a Boom
1b Arm
1c Bucket
1d Upper swing structure
3a Boom cylinder (hydraulic actuator)
3b Arm cylinder (hydraulic actuator)
3c Bucket cylinder (hydraulic actuator)
4A Operating device (first operating device)
4B Operating device (second operating device)
5 Control valve
6 Hydraulic pump
7 Engine
10 Motor generator
11 Vehicle body controller (control device)
12, 13 Inverter device
15 Battery (electric storage device)
16 Swing motor (electric actuator)
17, 18, 19, 20 Pressure sensor
21 Engine controller
22 Battery controller
25 Generator
41, 42, 43, 44 Minimum value selector
47 Selector
56 Regulator
63 Speed sensor
65 Speed converter
66 Speed controller
67 Torque limiter
68 Multiplier
69 Subtractor
71 Engine output ratio calculation unit
72 Powering rated power storage unit
75, 76, 77, 79 Multiplier
81 Torque converter
82, 83 Minimum value selector
84 Pump power converter
88, 89 Subtractor
92 Speed correction gain calculator
93 Power-running correction amount calculator
94 Regenerative power correction amount calculator
95 Powering torque limit calculator
96 Regenerative torque limit calculator
97 Selector
100 Swing control system
110 Speed limit value calculation system
120 Power limit value calculation system (power limit value calculation unit)

130 Torque limit value calculation system
200 Pump capacity control system
T Torque command
ω Swing speed

The invention claimed is:

1. A work machine comprising:
an engine;
a hydraulic pump driven by the engine;
a hydraulic actuator driven by hydraulic fluid delivered by the hydraulic pump;
an electric actuator driven electrically;
a first operating device which operates the hydraulic actuator; a second operating device which operates the electric actuator, and
a control device configured to calculate a target speed of the electric actuator in accordance with an operation amount of the second operating device, calculate a speed limit value of the electric actuator by correcting the target speed in accordance with an operation amount of the first operating device, calculate a torque limit value in accordance with the operation amount of the first operation device, the torque limit value used as a maximum torque of the electric actuator during the operation of the electric actuator, control a torque generated by the electric actuator to be lower than the torque limit value, and control a speed of the electric actuator to be lower than the speed limit value, wherein
the control device is further configured to calculate a power required to drive the hydraulic actuator in accordance with the operation amount of the first operating device, calculate a power limit value in accordance with the power required to drive the hydraulic actuator, the power limit value capable of being supplied to the electric actuator for driving the electric actuator, select the smaller of the torque limit value and a torque resulting from torque conversion of the power limit value, generate a torque command for the electric actuator in accordance with the selected value, and output the torque command to the electric actuator.

2. A work machine according to claim 1, wherein
the first operating device is operable in two directions, and
the power limit value of the electric actuator has characteristics corresponding to a direction in which the first operating device is operated.

3. A work machine according to claim 1, wherein
the electric actuator is a motor, and
the power limit value of the electric actuator is set independently depending on whether the motor is in a powering or regenerative operation.

* * * * *